United States Patent

Rosaen

[15] 3,666,101

[45] *May 30, 1972

[54] MULTIPLE FILTER DEVICE

[72] Inventor: Nils O. Rosaen, Bloomfield Hills, Mich.

[73] Assignee: Parker-Hannifin Corporation, Cleveland, Ohio

[ * ] Notice: The portion of the term of this patent subsequent to Feb. 3, 1987, has been disclaimed.

[22] Filed: Aug. 18, 1969

[21] Appl. No.: 850,730

[52] U.S. Cl..............................210/90, 210/132, 210/172, 210/DIG. 14
[51] Int. Cl.......................................B01d 27/10
[58] Field of Search.....................210/90, 130, 632, DIG. 14

[56] References Cited

UNITED STATES PATENTS 3,493,110   2/1970   Rosaen ..................................210/90

Primary Examiner—Samih N. Zaharna
Attorney—Hauke, Gifford and Patalidis

[57] ABSTRACT

A housing having a cylindrical filter element for filtering fluid circulated within a fluid system from a reservoir to a user and including a strainer slidably engaged about a shaft disposed along the axis of the filter. Fluid in such systems normally circulates axially upwardly from the reservoir through the inlet end of the filter and radially through the filter walls to the user. A refill charge of fluid is poured axially downwardly through the cylindrical filter and the filter inlet into the reservoir, in a direction opposite to the normal fluid circulation. The strainer is supported for axial movement in response to the fluid flow from a first position in which the strainer engages a seat formed around the fluid inlet when the reservoir is being refilled so as to trap foreign matter carried therein, to a second position in which the strainer is substantially spaced apart from the filter inlet permitting unrestricted fluid flow between the reservoir and the filter walls during normal fluid circulation.

14 Claims, 3 Drawing Figures

PATENTED MAY 30 1972 3,666,101

INVENTOR
NILS O. ROSAEN
BY Hauke, Gifford, & Patalidis
ATTORNEYS

MULTIPLE FILTER DEVICE

BACKGROUND OF THE INVENTION

1. Field Of The Invention

The present invention relates to fluid filtering devices, and more particularly to devices having multiple filters adapted to trap foreign matter in fluid flowing bidirectionally.

2. Description Of The Prior Art

In fluid systems, a fluid filtering device is commonly supported within the reservoir of the fluid system and adjacent the filter system opening. A filter element employed in such a device is generally cylindrically shaped and is combined with means for circulating the fluid axially into the filter element and radially outwardly through the filter wall. When the filter element is removed for cleaning, or when a refill charge of fluid is poured through the central portion of the filter into the reservoir in a direction which is reverse to the normal axial flow through the filter element, foreign matter which is dislodged from the filter or carried by the replenishing charge normally flows into the reservoir. Upon resumption of fluid circulation in the normal axial direction through the system, the added foreign matter is captured by the filter element resulting in a substantial decrease in its useful life. As foreign matter clogs the filter, the path available to the fluid is reduced creating a serious threat to the successful operation of the other components in the fluid system.

Applicant's copending U.S. application Ser. No. 632,962 filed Apr. 24, 1967, now U.S. Pat. No. 3,493,110, illustrates an improvement over such filter devices, and provides a strainer means effective to collect foreign matter carried by fluid flowing in a reverse direction from the inlet of the filter to the reservoir. This strainer means is effective to collect foreign matter carried by fluid flowing in an axial direction which is reverse to that of the normal circulating fluid flow, and moves to open a bypass route only when sufficient foreign matter has been trapped and a predetermined pressure differential exists across the strainer such as to lift the same from its seat at the filter inlet. The presence of the strainer proximate the inlet has been very effective in reducing the amount of foreign matter which would normally be circulated throughout the fluid system, however, such a strainer tends to reduce the rate of flow circulating in the normal direction from the reservoir through the inlet of the filter.

Accordingly, there is a need for a filtering device which traps foreign matter carried into the filter when the same is refilled with fluid through the filtering device and which does not impair the movement of fluid flowing during normal circulation from the reservoir through the filter and into the fluid system.

SUMMARY OF THE INVENTION

The present invention, which will be described in more detail hereafter, comprises a fluid filtering device which is disposed within a fluid filled reservoir and which has a conventional main cylindrical filter element with its upper end adjacent the reservoir opening and its lower or inlet end extending below the fluid level within the reservoir.

An elongated vertical guide rod supported by the housing of the device extends upwardly through the inlet of the main cylindrical filter and through a cap assembly which closes off the filter opening of the device.

A cup-shaped strainer is slidably mounted on the guide rod and is adapted to be shifted in response to fluid flow from a first position in which the stainer engages the filter inlet for straining fluid passing from the filtering device into the reservoir to a second position substantially spaced apart from the filter inlet to permit unrestricted fluid flow from the reservoir to the interior of the main filter.

Normal fluid circulation is upwardly through the lower end of the cylindrical filter element and radially outwardly in a filtering relationship through the cylindrical walls of the element.

A secondary filter element is mounted between the upper end of the main filter element and the cap assembly. When the main filter element has accumulated sufficient foreign matter on its inner wall surface to reduce fluid flow by a predetermined amount, a bypass valve carried within the cap assembly and responsive to the pressure increase across the filter, moves to open a bypass route from the interior of the main filter element and through the secondary filter element for discharge through the system. Indicating means mounted exteriorly of the cap assembly are operably connected to the bypass valve and provide a visual indication of the filtering condition of the main filter element by indicating the position of the bypass valve.

When the fluid level in the reservoir has been reduced sufficiently to require a refill charge of fluid, the cap assembly, the bypass assembly and the secondary filter are separated from the filter housing. The refill charge of fluid is poured through the upper end of the main filter and axially downwardly toward the filter element inlet. The cup-shaped strainer mounted on the guide rod is forced by the circulating fluid toward engagement with the inlet of the main filter element. The strainer provides a sediment trap for particles of foreign matter carried in the refill charge of fluid. The strainer also provides a means for trapping foreign matter dislodged from the interior walls of the main filter element as the fluid flows along the walls. As the strainer accumulates foreign particles, there is generally created an opposition to the normal upward fluid flow through the filter inlet, and a pressure differential across the strainer results therefrom. To preclude this opposition to the normal upward fluid flow, the strainer is adapted to slide upwardly under the force of the fluid when the same circulates in the normal direction. The force of the circulating fluid shifts the strainer to a position substantially spaced apart from the inlet of the filter, thereby permitting the fluid to flow from the reservoir without any encumbrance by the strainer. Since the normally circulating flow of fluid will not have to flow through the strainer, the flow will not be impeded, irrespective of the amount of foreign matter accumulated within the strainer. This novel arrangement permits the system fluid to flow in its normal path through the inlet of the filter while at the same time preventing foreign matter collected by the strainer from escaping. Furthermore, the strainer is removable as a unit from the reservoir with the main filter element and is adapted to capture foreign matter dislodged from the interior surface of the filter element during the removal process as such removal tends to cause foreign matter to be dislodged from the interior walls of the filter element.

Other objects, advantages and applications of the present invention will become apparent by the following detailed description of a preferred embodiment thereof.

DESCRIPTION OF THE DRAWINGS

The description refers to the accompanying drawing in which like reference characters refer to like parts throughout the several views and in which.

Figure 2:
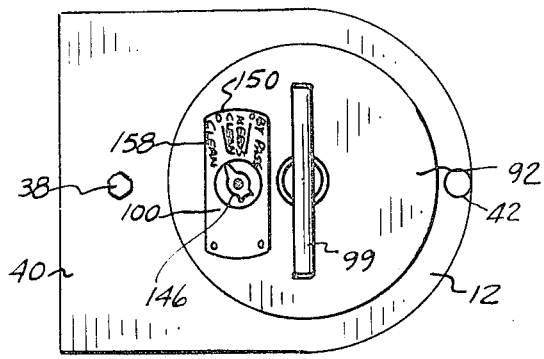
FIG. 2 is a top plan view of the filter device in FIG. 1.
Figure 3:
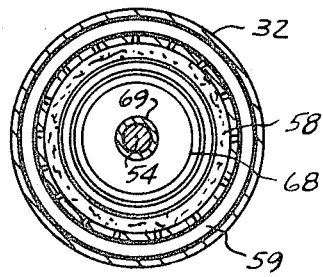
FIG. 3 is a transverse sectional view of the filter device taken along line 3—3 in FIG. 1.
Figure 1:
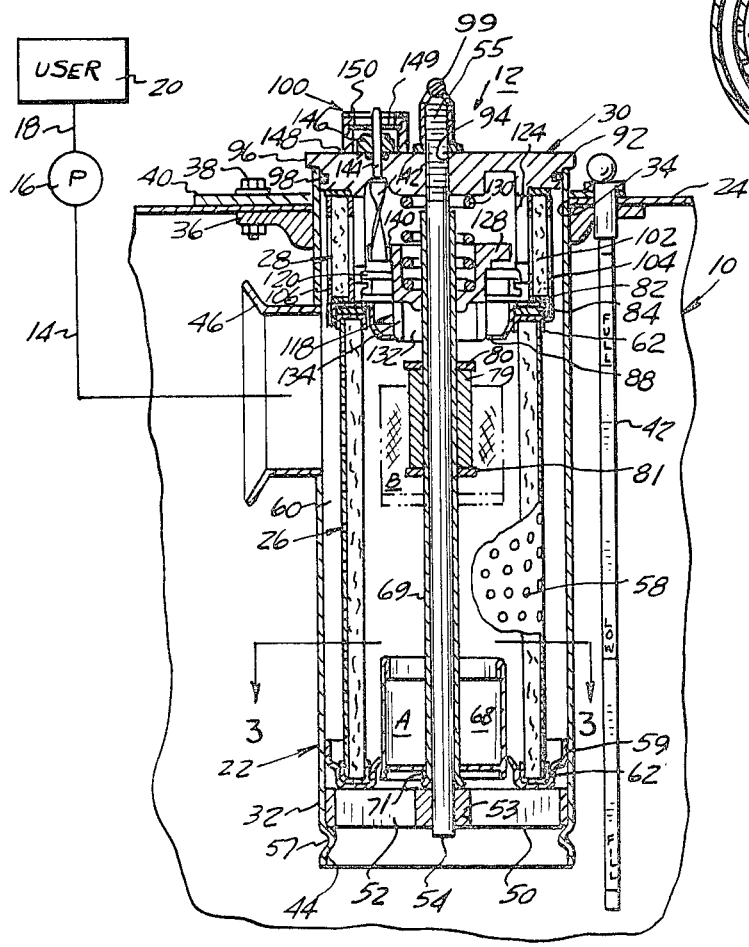
FIG. 1 is a view of a preferred fluid system with a longitudinal sectional view through a filter device illustrating a preferred form of the invention and with other parts of the system illustrated schematically.

Referring to the drawing, there is shown a fluid system which comprises a reservoir 10 having a filter device 12 mounted therein. Fluid from the reservoir 10 is drawn through the walls of the filter device 12 and through a discharge line 14 by means of a pump 16 which in turn discharges pressurized fluid through the line 18 to a fluid user 20. The filter device 12 is constructed of a series of subassemblies comprising a housing structure 22 mounted to an upper plate 24 of the reservoir 10. The upper plate 24 supports a main filter assembly 26, a bypass filter assembly 28 and a cap assembly 30, all of which will be described in detail hereinafter.

The housing structure 22 comprises an elongated, vertically mounted cylindrical housing member 32 having its upper end extending through a circular aperture 34 formed in the upper plate 24. The lower end of the housing 32 extends below the normal level of fluid in the reservoir 10. An annular flange 36 is fixed adjacent the upper end of the cylindrical housing 32 as by welding or the like, and is mounted by threaded fasteners 38 to the underside of the upper plate 24. Fasteners 38 also retain an flat member 40 on the upper surface of the upper plate 24. The member 40, the upper plate 24, and the flange 36 are apertured to receive an elongated dip-stick 42, which extends downwardly into the reservoir 10 adjacent the housing 32 and which is provided with suitable indicia to provide visual means for indicating the fluid level within the reservoir 10.

The lower end of the housing 32 is open to provide an inlet 44. A short tubular member provides a lateral outlet 46 from the housing 32 and is connected to the discharge line 14.

An annular angular member 50 is attached to the interior of the housing 32 adjacent the inlet 44 and has a plurality of spaced apertures 52 to permit fluid flow upwardly from the inlet 44.

An elongated vertical guide rod 54, having its lower end fixed to the annular member 50 as at 53 extends axially upwardly through the housing 32. An upper threaded portion 55 of the guide rod 54 extends above the upper end of the housing 32.

The housing 32 is preferably formed of a tubular section which is rolled to a reduced diameter at 57 for maintaining the annular member 50 in place. This method of joining the annular member 50 to the housing 32 provides a fluid tight seal between the two members which is capable of withstanding axial and torsional forces applied to the guide rod 54.

The main filter assembly 26 comprises a conventional cylindrical filter element 58 having a side wall formed of a suitable porous filtering material. The filter element 58 is seated within an apertured annular frame 59 which is secured to the annular member 50. The filter element 58 is of such a length that its upper end extends proximate the topmost part of the outlet 46. The periphery of the annular frame 59 is sealed fluid tight to the inside wall of the housing 52. The diameter of the filter element 58 is smaller than the diameter of the wall of the housing 32 so that an annular chamber 60 is formed between the filter element 58 and the housing 32.

The filter element 58 has an annular retainer element 62 attached to each of its open ends. Each retainer element 62 has a substantially U-shaped cross section. The main filter assembly 26 also includes a cup-shaped perforated strainer 68 which is slidably mounted on a bearing tube 69 surrounding the rod 54. The tube 69 isolates the strainer 68 from the rod 54 to preclude binding due to any misalignment between the several parts. Tube 69 rests on the annular member 50 at its flared end 71. The strainer 68 functions as a secondary filter and is intended to collect foreign matter having a greater particle size than is normally collected by the filter element 58.

The upper end of the strainer 68 is open and the strainer has a substantially constant diameter which is less than the inner diameter of the wall of the filter element 58. The strainer 68 is movable on the bearing tube 69 between a first lower position "A" wherein the sidewall of the cup-shaped strainer 68 engages in a fluid sealing relationship with the side surface of the apertured annular frame 59 while the bottom of the strainer 68 rests on the flared end 71 of the bearing tube 69. The strainer 68 is movable on the bearing tube 69 to a second raised position, indicated in phantom at "B," wherein the bottom wall of the strainer 68 is substantially spaced apart from its seated position "A" so that fluid flow to the interior of the filter element 58 is substantially unrestricted by the presence of the strainer 68.

The bearing tube 69 carries a permanent magnetic unit 79 which is held in place within the interior of the filter element 58 by a pair of snap-rings 80 and 81 disposed respectively above and below the magnetic unit 79. The magnetic unit 79 comprises a series of magnets arranged to separate magnetically attracted particles from the system fluid as the fluid passes through the interior of the filter element 58.

The main filter assembly 26 also includes an annular member 82 attached to the upper end of the filter element 58 and an annular seal element 84 disposed between the annular member 82 and the filter element 58. The downward extreme edge 88 of the member 82 is formed inwardly to form a pouring spout.

The cap assembly 30 comprises a cap 92 having a central aperture 94 for receiving the guide rod 54. The cap 92 closes off the upper end of the housing 32 and has an annular flange 96 seated on the upper end of the cylindrical housing 32. An annular seal 98 carried by the cap 92 abuts the inner surface of the cylindrical housing adjacent its upper end so as to provide a fluid tight seal. The cap 92 is locked in place by a handle section 99, the lower surface of which abuts the upper surface of the cap 92 and is which threaded to receive the rod end 55. The cap 92 also supports a visual indicating means 100, the operation of which will be described in greater detail hereinafter.

The bypass filter assembly 28 is attached to cap 92 and is normally removed and inserted as a unit with the cap 92. The bypass filter assembly comprises a cylindrical filter element 102 which is disposed between the upper surface of the annular member 82 and the bottom surface of the cap 92. A retainer 104 surrounding the bypass filter element 102 maintains the same in a proper position with respect to the other elements of the filter device. The retainer 104 has a series of annularly spaced apertures 106 for providing communication between the interior and exterior portions of the retainer 104. Thus, there is fluid communication between the interior of the bypass filter element 102 and the annular chamber 60 via the retainer apertures 106.

A cylindrical bypass valve 118 is slidably engaged with a cylindrically shaped annular valve seat 120. The cylindrical valve seat 120 is carried by a plurality of fingers 124 which extend downwardly from the cap 92. Each of the fingers 124 is provided with apertures therebetween to permit the passage of fluid to the bypass filter element 112. The cylindrical bypass valve 118 has an upper tubular section 128 which closes fluid communication between the upper and lower portions of the valve 118. The upper tubular section 128 is slidably engaged with the tubular bearing 69 and also functions as a seat for the lower end of the cylindrical spring member 130. The upper end of the spring 130 acts against the cap 92 so that the bypass valve 118 is biased towards a closed position wherein it is seated on the valve seat 120. In the closed position, the bypass valve 118 closes off fluid communication between the interior of the main filter element 58 and the interior of the bypass filter element 102.

The cylindrical bypass valve 118 is provided with a lower tubular section 132 which is provided with a plurality of annularly spaced apertures 134, which extend upwardly from the lower edge of the tubular section 132 toward the upper tubular section 128. The cylindrical bypass valve 118 is movable upwardly in response to the force acting thereon against the opposing bias of the spring 130 wherein the apertures 134 clear the upper edge of the valve seat 120 so that fluid communication between the interior of the filter element 58 and the bypass element 102 is open thereby allowing fluid flow from the reservoir through the interior of the filter element 58 across the bypass filter element 102 and then radially outwardly into the chamber 60.

The axial movement of the bypass valve 118 is indicated by the indicator means 100. A slotted member 140, carried at the upper end of the bypass valve 118, engages an actuator member 142 which is supported for rotation by a pin 144. The actuator member 142 comprises an elongated flat strip having a uniform longitudinal twist so that the linear axial movement of the arm 140 rotates the pin 144. The pin 144 is supported for rotation in the cap 92 with its upper end extending above the surface of the cap 92 and supporting a pointer member 146. Seal members 148 provide a fluid tight seal between the pin 144 and the cap 92.

A closed hollow boss 149 encloses the pointer element 146 and supports an indicia plate 150 above the pointer element 146. The plate 150 is provided with suitable indicia 158 to provide the operator with a visual means for indicating whether or not the filter element 58 requires cleaning or replacement.

OPERATION

During normal operation of the filter device the strainer 68 is positioned wholly within the filter element 58 substantially upwardly of the apertured annular frame 59 so that all the fluid passing from the reservoir through the inlet 44 of the housing 32 and radially through the walls of the main filter element 58 is completely unencumbered by the strainer 68. The strainer 68 is maintained at the position "B" due to the force of the fluid acting thereon. The bypass valve 118 is in its seated position against the valve seat 120 so that fluid communication between the interior of the filter element 58 and the interior of the filter element 102 is closed off. Thus, normal fluid flow circulation is axially through the annular frame 59 into the interior of the filter element 58 and then radially outwardly to the outer chamber 60 without any interference from the strainer 68. Fluid passing to the annular chamber 60 is discharged through the outlet 46.

The bypass valve 118 is movable between a position in which it engages the valve seat 120 and a position in which it is moved axially away from the valve seat 120. Its position is dependent upon the filtering condition of the filter element 58. Normally, fluid flow is radially outwardly through the wall of the filter element 58 and through the annular chamber 60 but as the filter element 58 accumulates foreign matter a pressure differential is created between the upper and lower surfaces of the bypass valve 118. As the filter element 58 becomes clogged the net force due to this pressure differential acting against the lower surface of the bypass valve 118 urges the same upwardly against the bias of the spring 130.

The spring 130 is chosen with an elasticity such that it permits the valve 118 to move axially upward toward its open position wherein the apertures 134 register with the interior of bypass filter element 102 thereby opening a bypass route. This bypass route permits fluid from the interior of the element 58 to flow through the walls of the bypass filter 102, through the apertures 106 of the retainer 104 and radially outwardly into the outer chamber 60 to be discharged into the outlet 46.

As the bypass valve 118 moves from its normal position to its open bypass position, the pointer 146 of the indicator means 100 is rotated to a position wherein it registers with that indicia 158 associated with the filtering condition of the filter element 58 so that the operator is able to determine whether or not the filter element 58 requires cleaning or replacement.

When it is necessary to remove the cap 92 in order to clean or replace the main filter element 58 or to replenish the fluid within the reservoir 10, the handle section 99 is disengaged from the guide rod 54 to permit the cap assembly 30 and the bypass assembly 28 to be removed as a unit from the housing 32 while permitting the main filter assembly 58 and the strainer 68 to remain in place. Since fluid is not flowing from the reservoir into the interior of the filter element 58 and thus no force will be exerted against the strainer 68 the same will either fall by gravity or will be urged toward the position at "A" by the force of the replenishing fluid. The fluid is poured axially through the filter element 58 and downwardly through the strainer 68 wherein any relatively large particles of foreign matter carried by the refill charge are separated therefrom before it is mixed with the fluid in the reservoir 10.

When either the filter element 58 or the strainer 68 is to be cleaned or replaced, the filter element 58 is withdrawn axially upwardly from within the reservoir 10, and the bearing tube 69 is drawn axially upwardly and separated from the guide rod 54. Removal of the bearing rod 69 carries the strainer 68 with it. It is generally advisable to remove the filter element 58 first or along with the strainer 68 as any accumulations of foreign matter that are dislodged from the wall surface of the element 58 will fall downwardly for collection by the strainer 68 thereby further eliminating the possibility of contamination going back into the reservoir 10.

Having thus described my invention, what is claimed is:

1. In a fluid filter device, the combination comprising:
a first filter element having a filtering wall, open at one end;
means including a housing surrounding said first filter element for directing fluid flow in a normal direction axially through the open end of said first filter element and outwardly through said first filter element;
a second filter element disposed within said first filter element;
means supported by said housing and extending into said first filter element and supporting said second filter element for freely slidable movement toward and away from the open end of said first filter element between a first position wherein said second filter element is engaged with said open end to filter fluid passing through said second open end in a direction opposite to said normal direction; and
a second position wherein said second filter element is disengaged and substantially spaced apart from said open end and inwardly of said first filter element to permit unrestricted fluid flow through said open end in said normal direction, said second filter element being movable between said positions in response to the direction of said fluid flow through said open end.

2. The filter device as defined in claim 1, wherein said first and second filter elements each have different filtering mesh for removing foreign matter of different particle sizes.

3. The filter device as defined in claim 1, wherein said first filter element has a cylindrical sidewall formed symmetrically around an axis, and including means defining a continuous seat adjacent the open end of said first filter element, said supporting means supporting said second filter element for movement along said axis between positions wherein said second filter element is engaged and disengaged from said continuous seat.

4. The filter device as defined in claim 3, wherein said second filter element has a closed filtering wall, open at one end and closed at the end opposite of said one end.

5. The filter device as defined in claim 4, wherein said continuous seat is symmetrical about said axis and said second filter open end faces the closed end of said first filter element.

6. The filter device as defined in claim 5, wherein said second filter element open end forms a trap for collecting foreign particles from fluid flowing in the direction opposite normal fluid flow.

7. The fluid filter device as defined in claim 6, including means for supporting said first and second filter elements within a fluid reservoir, said support means permitting removal of said first and second filter elements by movement along said axis.

8. The fluid filtering device as defined in claim 7 wherein said fluid directing means normally directs fluid axially through said open end and into said first fluid element; and said reservoir includes means permitting a refill quantity of fluid to be discharged axially through said first filter element and through said open end in an axial direction opposite to said normal direction so that said second filter element removes foreign matter from said refill quantity of fluid.

9. A fluid filtering device as defined in claim 8, wherein the foreign matter collected from the fluid flowing in said normal direction is accumulated on the interior wall of said first filter element, and said second filter element traps said accumulated foreign matter falling from said first filter element when said first filter element is withdrawn from said reservoir in an axial direction corresponding to said normal direction of said fluid flow.

10. The filter device as defined in claim 9, including a third filter element and means responsive to a clogged condition of said first filter element to open a bypass route from the interior of said first filter element and through said third filter element.

11. The filter device as defined in claim 10, including a member movable from an initial position to positions corresponding to the clogged condition of said first filter element, said member being cooperatively connected to said bypass opening means and further including readout means providing a visual indication exteriorly of said reservoir of the condition of said first fluid element, said readout means being operably connected to said movable member.

12. In a fluid system having a fluid reservoir, said reservoir having an opening disposed above the level of the fluid therein, a filter device comprising:

- a housing disposed within said reservoir and having a cylindrical filter chamber and an inlet and an outlet opening to said chamber, said housing being provided with an upper opening registering with said filter chamber;
- means carried by said reservoir for supporting said housing in said reservoir opening with said inlet disposed below the fluid level of said reservoir;
- a filter assembly carried by said housing and including a cylindrical filter element and having a lower end in registry with said inlet and being spaced from a portion of the housing wall defining said filter chamber to define a substantially annular outlet chamber communicating with said outlet;
- a cover member for normally closing said reservoir opening and the upper end of said filter element and being removable to permit the introduction of a replenishing quantity of fluid through the interior of said filter element and into said reservoir;
- a rod extending into said filter element; a second filter element carried on said rod within said first mentioned filter element and freely slidable along said rod between a first position extending across the lower end of said first mentioned filter element to filter fluid introduced into said reservoir through said upper opening and a second position substantially spaced apart upwardly from said lower open end of said first mentioned filter element so as to not interfere with the fluid flow from said reservoir through said open lower end, said second filter element being movable between said first and second positions in response to the direction of fluid flow through said lower open end.

13. The fluid device as defined in claim 1 and in which said second filter supporting means comprises a rod and a bearing tube mounted over said rod.

14. In a fluid system having a fluid reservoir, said reservoir having an opening disposed above the level of the fluid therein, a filter device comprising:

- a housing disposed within said reservoir and having a filter chamber and an inlet and an outlet opening to said chamber, said housing being provided with an upper opening registering with said filter chamber;
- means carried by said reservoir for supporting said housing in said reservoir opening with said inlet disposed below the fluid level of said reservoir;
- a filter assembly carried by said housing and including a filter element having a lower end in registry with said inlet and being spaced from a portion of the housing wall defining said filter chamber to define an outlet chamber intermediate said filter element and said housing wall, said outlet chamber communicating with said outlet;
- a cover member for closing said reservoir opening and the upper end of said filter element and being movable to permit the introduction of a replenishing quantity of fluid through the interior of said filter element and into said reservoir;
- a second filter element and means supported by said housing and extending into said first filter element for mounting said second filter element within said first filter element to be freely movable solely by gravity and by fluid flowing downwardly through said lower open end of said first filter element to a lower position extending across said lower open end of said first filter element and to be freely movable by fluid flowing upwardly through said lower open end of said first filter element to an upper position in which said second filter element is disposed wholly within said first filter element.

* * * * *